(12) United States Patent
Engler et al.

(10) Patent No.: US 7,819,023 B2
(45) Date of Patent: Oct. 26, 2010

(54) VALVE WITH INHERENT ENHANCED TURBULENT FLOW METERING DEVICE AND FLOW REGULATION

(75) Inventors: Kevin J. Engler, St. Charles, IL (US); Jerome C. Klopp, Arlington Heights, IL (US); Mark A. Hentschel, Elburn, IL (US)

(73) Assignee: Robertshaw Controls Company, Carol Stream, IL (US)

( * ) Notice: Subject to any disclaimer, the term of this patent is extended or adjusted under 35 U.S.C. 154(b) by 393 days.

(21) Appl. No.: 11/844,208

(22) Filed: Aug. 23, 2007

(65) Prior Publication Data

US 2008/0048142 A1    Feb. 28, 2008

Related U.S. Application Data

(60) Provisional application No. 60/839,963, filed on Aug. 24, 2006.

(51) Int. Cl.
*G01F 1/08* (2006.01)
*G01F 1/05* (2006.01)

(52) U.S. Cl. ............... 73/861.82; 73/861.79; 73/861.89
(58) Field of Classification Search ................ None
See application file for complete search history.

(56) References Cited

U.S. PATENT DOCUMENTS

| | | | |
|---|---|---|---|
| 3,918,305 A | | 11/1975 | Benedict |
| 3,926,654 A | | 12/1975 | Claes |
| 3,948,099 A | * | 4/1976 | Geisow .................... 73/861.92 |
| 3,999,432 A | * | 12/1976 | Coninx et al. ............ 73/861.91 |
| 4,378,703 A | | 4/1983 | Furness et al. |
| 4,576,002 A | | 3/1986 | Mavrocostas |
| 4,856,348 A | * | 8/1989 | Hall ........................ 73/861.78 |

(Continued)

FOREIGN PATENT DOCUMENTS

| | | |
|---|---|---|
| GB | 1022299 A | 3/1966 |
| GB | 1410230 A | 10/1975 |

OTHER PUBLICATIONS

Eltek Group, 10.0550 Solenoid valves with integrated flowmeter, web pages printed from website and product details printed from website, date last visited Feb. 28, 2008, 4 pages, http://www.eltekgroup.com/eng/Misuratori.html.

*Primary Examiner*—Harshad Patel
(74) *Attorney, Agent, or Firm*—Reinhart Boerner Van Deuren P.C.

(57) ABSTRACT

A valve incorporates a device causing turbulents in the water stream just before passing over the turbine fins of the flow sensor. The device actually increases the Reynolds number or turbulence of the water stream increasing the contact of the water on the turbine. This causes the turbine to rotate more efficiently for the given flow volume passing over the flow measuring device. The improved efficiency results in better accuracy and performance over the entire flow range. In one embodiment the turbulent device forces the flow stream to rotate counter clockwise and hit the turbine fins causing higher force which makes the turbine turn more efficiently. The turbine is designed such that the major portion of the fin surface area is perpendicular to the turbulent flow stream. This opposed direction causes more force to be placed on the turbine fin by the water stream.

20 Claims, 2 Drawing Sheets

U.S. PATENT DOCUMENTS

| | | |
|---|---|---|
| 4,892,114 A | 1/1990 | Maroney et al. |
| 5,429,272 A | 7/1995 | Luigi |
| 5,866,824 A * | 2/1999 | Schieber .................. 73/861.79 |
| 5,927,400 A | 7/1999 | Bononi et al. |
| 5,929,345 A | 7/1999 | Gadini |
| RE36,401 E * | 11/1999 | Fitzpatrick et al. ............ 73/300 |
| 7,117,595 B2 | 10/2006 | Gadini et al. |
| 2001/0003286 A1 | 6/2001 | Philippbar et al. |

* cited by examiner

VALVE WITH INHERENT ENHANCED TURBULENT FLOW METERING DEVICE AND FLOW REGULATION

CROSS-REFERENCE TO RELATED PATENT APPLICATION

This patent application claims the benefit of U.S. Provisional Patent Application No. 60/839,963, filed Aug. 24, 2006, the teaching and disclosure of which are hereby incorporated in their entireties by reference thereto.

FIELD OF THE INVENTION

This invention generally relates to fluid flow metering devices, and more particularly to fluid flow metering devices that utilize a magnetic turbine sensing device for flow metering.

BACKGROUND OF THE INVENTION

Dishwasher manufacturers have a need for accurately determining the water fill volume of each wash and rinse cycle. However, because the water pressure varies from installation location to location, the fill rate, i.e. the amount of water that flows for a given period of time, varies. As such, a timed fill cycle may result in too much or too little water being dispensed. To properly operate the appliance, therefore, it is important to actually measure the amount of water that is dispensed during the fill cycle. This can be determined by either a level switch that senses the amount of water in the tub, or by sensing the water as it is being dispensed through some type of flow measuring device.

A turbine-type flow device with magnetic sensing has been used in the past to measure the flow of water through the flow control valve during the water dispensing period. The controller of the appliance detects the electrical pulses generated as the turbine rotates under the flow of the water, and calculates the amount of water that has been dispensed. Once the proper amount of water has been dispensed, as determined by the appliance controller, the flow control valve is turned off. One such turbine-type flow metering device is described in U.S. Pat. No. 5,429,272, entitled Device for Controlling, by Means of an Electrovalve, the Volume Liquid Flowing to a Receptacle.

Unfortunately, there are limitations on the accuracy of such turbine-type flow metering devices that limit the ability of the controller to precisely determine how much water has been dispensed by the valve. Such limitations are due, at least in part, to the lack of efficiency of the energy transfer from the water to make the turbine rotate. Such force from the flowing water stream must overcome the friction and magnetic interference that tends to impede the rotation of the turbine. Such problems are particularly acute in installations that have a low water pressure, and therefore a low flow rate of the water through the valve and over the turbine-type flow meter. At such low flow rates, the turbine tends to rotate intermittently or at a rate that does not truly reflect the amount of water that has been dispensed.

There is, therefore, a need in the art for a fluid flow metering device that increases the efficiency of a standard turbine-type flow metering device with magnetic sensing. The present invention provides such a device. These and other advantages of the invention, as well as additional inventive features, will be apparent from the description of the invention provided herein.

BRIEF SUMMARY OF THE INVENTION

A preferred embodiment of the present invention provides a new and improved turbine-type flow metering device. More particularly, embodiments of the present invention provide a new and improved flow metering valve that utilizes a turbine-type metering device for more accurately measuring the flow of fluid therethrough.

In one embodiment, the flow metering valve incorporates a device causing turbulence in the water stream just before passing over the turbine fins of the flow sensor. The device actually increases the Reynolds number or turbulence of the water stream, which results in increasing contact of the water on the turbine blades themselves. This causes the turbine to rotate more efficiently for the given flow volume passing over the flow measuring device. The improved efficiency results in better accuracy and performance over the entire flow range.

One embodiment of the invention forces the flow stream to rotate counter clockwise and hit the turbine fins causing higher force to be applied to the surface of the fins, which makes the turbine turn more efficiently. The turbine is designed such that the major portion of the fin surface area is perpendicular to the turbulent flow stream. This opposed direction causes more force to be placed on the turbine fin by the water stream.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
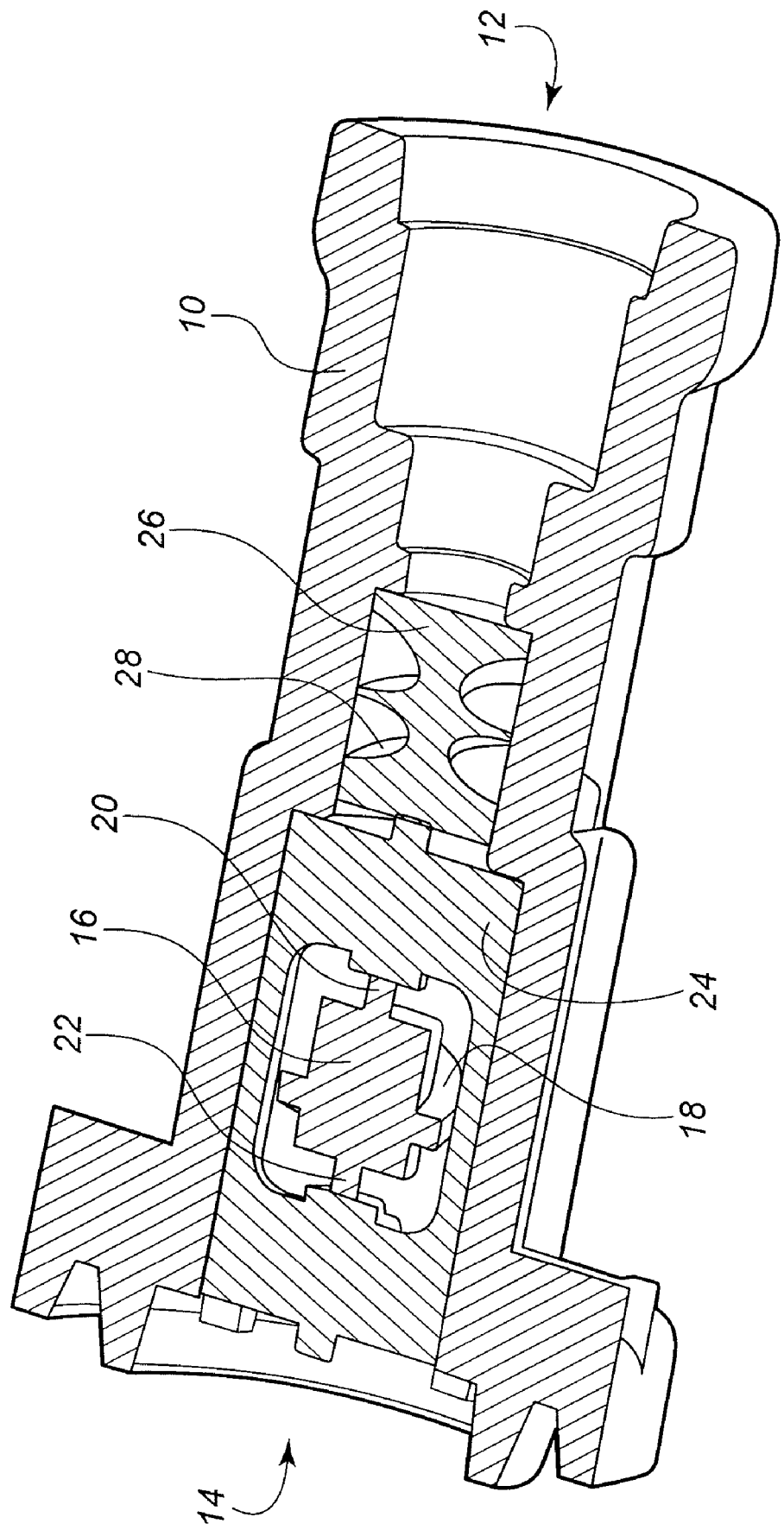
FIG. 1 is a cross sectional illustration of one embodiment of a valve incorporating a turbine-type flow meter and a turbulent device constructed in accordance with the teachings of the present invention.

Turning now to the drawings wherein like elements are identified by like numerals, and in particular to FIG. 1, there is illustrated a portion of a valve or conduit through which a fluid may flow. More specifically, FIG. 1 illustrates a body in the form of a flow connector 10 of a water metering valve that may be used, e.g., in an appliance such as a dishwasher or clothes washing machine. However, as will be recognized by those skilled in the art from the following description, such embodiments are provided by way of example only, and not by way of limitation. Indeed, the device of the present invention may be used in other embodiments in which the accurate metering of fluid flow therethrough is important or desired.

As shown in FIG. 1, the flow connector 10 includes a first end 12 and a second end 14, between which is a flow channel through which fluid, e.g. water, flows. In the illustrated embodiment, the direction of water flow is from the first end 12 to the second end 14. To monitor the flow of water through this flow connector 10, a turbine-type flow meter, having a rotating magnetic turbine 16, is used. This rotating magnetic turbine 16 includes angled fins 18 across which the water flows to impart rotation to the turbine 16. The turbine 16 is held in place in the flow channel by a fixed element 24 across which the water may flow. The turbine 16 is rotationally connected to the fixed element 24 by shaft ends 20, 22.

As discussed above, such turbines 16 experience frictional and magnetic interferences forces that tend to impede the free rotation thereof under the force of the water flow thereacross. This tends to reduce the efficiency of rotation resulting in inaccuracies in determining the actual amount of water that has flowed thereacross, particularly at low flow rates. To overcome this issue, a turbulent device 26 is positioned in the flow stream, upstream of the turbine 16. Preferably, the turbulent device 26 is fixed in position in the flow stream. The turbulent device 26 includes an outer helical surface 28 that causes the water flowing through the flow connector 10 to rotate or spin within the flow channel as it flows across the helical surface 28. The direction of rotation caused by the helical surface 28 is the same as the direction of rotation of the turbine 16 under normal flow through the flow connector 10.

The turbulent device 26 actually increases the Reynolds number or turbulence of the water stream as it flows over the helical surface 28. When positioned upstream of the turbine 16 as illustrated in FIG. 1, the contact force of the water on the fins 18 of turbine 16 is increased. This causes the turbine 16 to rotate more efficiently for the given flow volume passing over the flow measuring device. That is, through the use of the turbulent device 26, the force of the flow on the turbine fins 18 is better able to overcome the frictional forces and the magnetic interference experienced by the turbine 16. The improved efficiency results in better accuracy and performance over the entire flow range.

Previous devices meant to perform the same effect are described as flow diverters. These devices typically make use simply of a frusto-conical shape or design in the water stream. These devices are effective in causing the water stream to have higher velocity at the walls of the flow channel, which causes better flow at the outermost walls of the flow stream. Unfortunately, such flow does little for increasing the direct contact or force on the turbine fins 18 because the flow is not perpendicular to the surface of the fins 18 themselves.

With the turbulent device 26 of the present invention, the flow vectors of the water flowing to the turbine 16 are more nearly perpendicular to the contact surface of the fins 18. This increases the force on the fins 18, even at low flow rates, which aids in the rotation of the turbine 16. Without the turbulent device 26, the flow vectors are along the axis of the flow path of the flow connector 10. Such vectors interact with the angled fins 18 in such a manner so as to transfer only a portion of the force in a direction to rotate the turbine 16, while a portion of the force actually causes increased friction on the downstream shaft end 22 as the turbine 16 is forced toward the second end 14. The turbulent device 26 changes this dynamic and enables the transfer of more force in a rotational direction to aid rotation of the turbine 16 to overcome the frictional and magnetic interference forces that would otherwise tend to impede rotation thereof.

Figure 2:
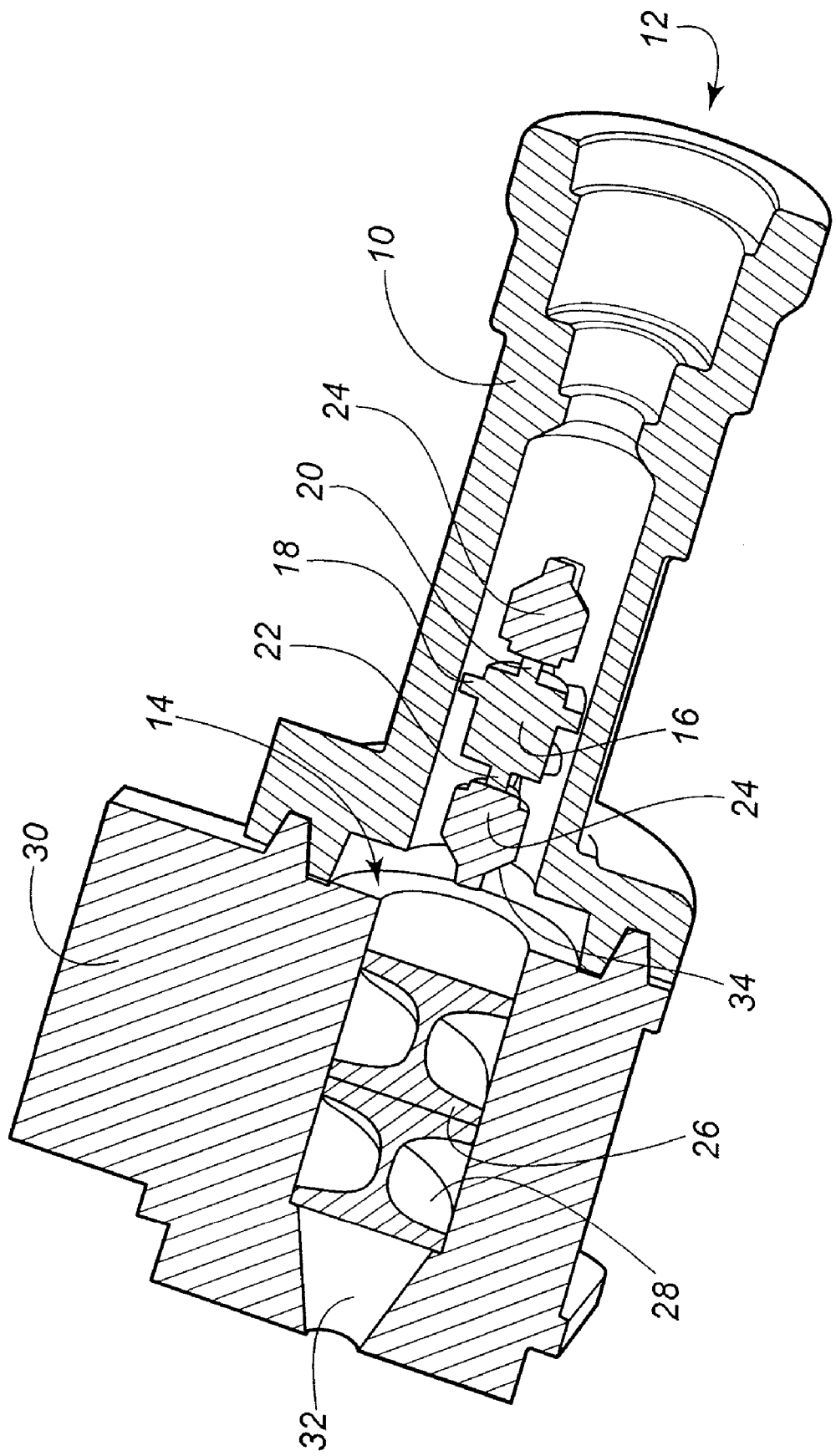
FIG. 2 is a cross sectional illustration of another embodiment of a valve incorporating a turbine-type flow meter and a turbulent device constructed in accordance with the teachings of the present invention.

Turning now to FIG. 2, there is illustrated another embodiment constructed in accordance with the teachings of the present invention. In this embodiment, a frusto-conical flow diverter (surface 34 of fixed element 24) is used in addition to the turbulent device 26. In this alternate embodiment, the valve operator 30 (not show in FIG. 1) houses the turbulent device 26 (although the valving components themselves have not been illustrated for purposes of clarity). In this embodiment, a flow restrictor 32 is provided to control the flow through the valve to a certain pre-determined flow rate. Depending on the particular installation and flow needs of the system, other embodiments may not incorporate such a flow restrictor 32. It is also noted that in the embodiment of FIG. 2, the flow through flow connector 10 is reversed from that of FIG. 1.

As with the previous embodiment, the turbulent device 26 is located in the flow stream upstream of the turbine 16. As illustrated, it is also located downstream from the flow regulator 32 of the valve operator 30. The helical surface 28 of the turbulent device 26 is oriented to cause the flow of water through the valve to rotate counter clockwise (or clockwise, depending on the geometry of the fins 18 of the turbine 16 used in the flow meter). This turbulent, rotating flow then enters the second end 14 of the flow connector 10 wherein it encounters the flow meter before flowing out of the first end 12 of the flow connector 10.

The flow meter includes the rotating magnetic turbine 16 rotationally positioned by shaft ends 20, 22 between two fixed elements 24, and is positioned in the flow connector 10 after the operator 30 of the valve. In this embodiment, at least the leading fixed element 24 is configured to have a frusto-conical surface 34 to further aid in directing the flow toward the fins 18 of the turbine 16 and generally aiding the flow of water therethrough.

As with the previous embodiment, the turbine 16 has fins 18 fashioned to cause it to rotate in the same direction as the rotation of the water caused by the helical surface 28, i.e. counter clockwise in the illustrated embodiment. The fin 18 surface area is preferably configured so that they are approximately perpendicular to the flow stream as it is directed by the turbulent device 26. As such, the flow of the water through the flow connector 10 after the turbulent device 26 contacts the fins 18 of the turbine 16 in a generally perpendicular orientation, causing increased force on the fins 18. This ensures efficient rotation of the turbine 16, even for low flow rates.

A magnetic measurement device such as a hall effect sensor, permalloy, or reed sensor (not shown) detects the magnetic field imposed by the magnetically charged turbine 16 as is known in the art. This sensor or the controller to which it is connected is electronically fashioned to determine the flow and/or volume of water flowing or that has flowed through the valve as determined from the rate and/or number of pulses detected by the magnetic sensor. The appliance controller can then properly turn off the valve when the proper amount of water has been dispensed, regardless of the water pressure at the installation location.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve having a flow channel defined therethrough, comprising:
    a turbine rotationally positioned within the flow channel; and
    a turbulent device fixedly positioned within the flow channel upstream of the turbine, the turbulent device having a helical outer surface that forms at least one helical flow path that traverses an entire periphery of the turbulent device.

2. The valve of claim 1, wherein the helical outer surface of the turbulent device is configured to extend entirely across the flow channel.

3. The valve of claim 1, wherein the turbine includes at least one fin positioned on an outer surface thereof and configured to impart rotation in a first direction to the turbine in the presence of fluid flow through the flow channel, and wherein the helical outer surface of the turbulent device is configured to impart rotation of the fluid flow through the flow channel in the first direction.

4. The valve of claim 3, wherein the at least one fin is configured to impart counter-clockwise rotation of the turbine, and wherein the helical outer surface is configured to impart counter-clockwise rotation of the fluid flow downstream thereof.

5. The valve of claim 1, further comprising at least one fixed element secured within the flow channel, and wherein the turbine is rotationally attached to the at least one fixed element.

6. The valve of claim 5, wherein the turbine is rotationally attached to the at least one fixed element by a pair of shaft ends.

7. The valve of claim 5, wherein the at least one fixed element includes an upstream fixed element and a downstream fixed element.

8. The valve of claim 7, wherein the upstream fixed element includes a frusto-conical leading surface.

9. The valve of claim 8, wherein the downstream fixed element includes a frusto-conical trailing surface.

10. The valve of claim 1, further comprising a flow connector having a first end and a second end, the flow channel extending therethrough, and wherein the turbine is positioned in the flow connector.

11. The valve of claim 10, wherein the turbulent device is positioned in the flow connector.

12. The valve of claim 10, further comprising a valve operator, the flow channel extending therethrough, and wherein the turbulent device is positioned in the valve operator.

13. The valve of claim 12, wherein the valve operator includes a flow restrictor.

14. An apparatus, comprising:
    a body defining a flow channel therethrough;
    a turbine rotationally positioned within the flow channel; and
    a turbulent device positioned within the flow channel upstream of the turbine, the turbulent device configured to include a helical outer surface that forms at least one helical flow path that traverses an entire periphery of the turbulent device to increase the Reynolds number of a fluid flowing through the flow channel.

15. The apparatus of claim 14, wherein the helical outer surface contacts an inner surface of the flow channel, the helical flow path being defined therebetween.

16. The apparatus of claim 15, wherein the turbine includes at least one fin positioned on an outer surface thereof and configured to rotate the turbine in the presence of fluid flowing through the flow channel, and wherein the helical outer surface of the turbulent device is configured to increase turbulence of the fluid so as to aid rotation of the turbine.

17. The apparatus of claim 15, wherein the turbine includes at least one fin positioned on an outer surface thereof and configured to rotate the turbine in a first direction in the presence of fluid flowing through the flow channel, and wherein the helical outer surface of the turbulent device is configured to cause rotation in the first direction in the fluid flowing through the channel upstream of the turbine.

18. The apparatus of claim 15, wherein the turbine includes at least one fin positioned on an outer surface thereof and configured to rotate the turbine when fluid flowing through the flow channel contacts a surface thereof, and wherein the helical outer surface of the turbulent device is configured to cause rotation in the fluid flowing through the channel such that the fluid contacts the surface of the at least one fin generally perpendicular.

19. The apparatus of claim 15, wherein the turbine includes at least one fin positioned on an outer surface thereof and configured to rotate the turbine when fluid flowing through the flow channel contacts a surface thereof, and wherein the helical outer surface of the turbulent device is configured to direct the fluid flowing through the channel generally normal to the surface of the at least one fin.

20. A valve, comprising:
    a valve operator having a first fluid passage defined therethrough;
    a flow connector connected to the valve operator, the flow connector having a second fluid passage defined therethrough in fluid communication with the first fluid passage, the first fluid passage and the second fluid passage forming a flow channel;
    a turbine rotationally positioned within the flow channel; and
    a turbulent device positioned within the flow channel upstream of the turbine, the turbulent device having a helical outer surface that forms at least one helical flow path that traverses an entire periphery of the turbulent device that is configured to increase turbulence of fluid flowing through the flow channel.

* * * * *